(12) United States Patent
Wang et al.

(10) Patent No.: US 11,548,056 B2
(45) Date of Patent: Jan. 10, 2023

(54) SYSTEMS AND METHODS FOR JOINING COMPONENTS BY RIVETING

(71) Applicant: GM GLOBAL TECHNOLOGY OPERATIONS LLC, Detroit, MI (US)

(72) Inventors: Pei-chung Wang, Troy, MI (US); Susan M. Smyth, Rochester Hills, MI (US); Bradley J. Blaski, Sterling Heights, MI (US); Zhongxia Liu, Zhengzhou (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 476 days.

(21) Appl. No.: 16/749,362

(22) Filed: Jan. 22, 2020

(65) Prior Publication Data

US 2020/0164424 A1    May 28, 2020

Related U.S. Application Data

(62) Division of application No. 15/355,695, filed on Nov. 18, 2016, now Pat. No. 10,576,532.

(Continued)

(51) Int. Cl.
*B29C 65/00* (2006.01)
*B21J 15/02* (2006.01)
(Continued)

(52) U.S. Cl.
CPC ............. *B21J 15/02* (2013.01); *B21J 15/025* (2013.01); *B21J 15/10* (2013.01); *B21J 15/147* (2013.01);
(Continued)

(58) Field of Classification Search
CPC ............ Y10T 403/4974; B29C 65/562; B29C 66/1122; B29C 66/21; B29C 66/41;
(Continued)

(56) References Cited

U.S. PATENT DOCUMENTS

| 5,140,735 A | 8/1992 | Ladouceur |
| 6,546,613 B2 | 4/2003 | Donovan |

(Continued)

FOREIGN PATENT DOCUMENTS

| CN | 1955497 A | 5/2007 |
| CN | 104399859 A | 3/2015 |

(Continued)

OTHER PUBLICATIONS

Henrob-Self Pierce Riveting, Pushing the Boundaries of Riveting Technology; 2013; pp. 1-4.

*Primary Examiner* — James D Sells
(74) *Attorney, Agent, or Firm* — Vivacqua Crane PLLC (57) ABSTRACT

A riveting system, for use in mechanically linking adjacent workpieces, including a rivet having a height greater than a sum of thicknesses, measured along a line of riveting, of the workpieces being linked, so that the rivet can pass fully through the workpieces. The system also includes a riveting die, which may be a separate product. The die includes a protrusion extending from a peak toward a transition point; and a trough having a trough surface. The trough surface includes a trough inner wall, extending from the transition point to a trough bottom, and a trough outer wall, extending from the trough bottom to a trough outer edge. The technology also includes computerized systems for comparing a load-displacement profile of riveting to a pre-set profile to determine whether the riveting was performed properly.

14 Claims, 5 Drawing Sheets

Related U.S. Application Data (60) Provisional application No. 62/266,808, filed on Dec. 14, 2015.

(51) Int. Cl.
*B21J 15/36* (2006.01)
*B21J 15/28* (2006.01)
*B21J 15/14* (2006.01)
*B29C 65/56* (2006.01)
*B21J 15/10* (2006.01)

(52) U.S. Cl.
CPC .............. *B21J 15/285* (2013.01); *B21J 15/36* (2013.01); *B29C 65/562* (2013.01); *B29C 66/1122* (2013.01); *B29C 66/21* (2013.01); *B29C 66/41* (2013.01); *B29C 66/721* (2013.01); *B29C 66/73921* (2013.01); *B29C 66/81427* (2013.01); *B29C 66/81431* (2013.01); *B29C 66/7212* (2013.01); *B29C 66/81422* (2013.01); *B29C 66/81423* (2013.01); *Y10T 403/4974* (2015.01)

(58) Field of Classification Search
CPC .............. B29C 66/721; B29C 66/7212; B29C 66/73921; B29C 66/81422; B29C 66/81423; B29C 66/81427; B29C 66/81431
USPC ......................................................... 403/283
See application file for complete search history.

(56) References Cited

U.S. PATENT DOCUMENTS

| | | | |
|---|---|---|---|
| 7,047,617 | B2 | 5/2006 | Ladouceur |
| 7,284,319 | B2 | 10/2007 | Kato et al. |
| 7,594,421 | B2 | 9/2009 | Babej |
| 10,576,532 | B2 * | 3/2020 | Wang ................ B29C 66/73921 |
| 2002/0038566 | A1 | 4/2002 | Jokisch |
| 2010/0287752 | A1 | 11/2010 | Wojciechowski |
| 2015/0239077 | A1 | 8/2015 | Freis |

FOREIGN PATENT DOCUMENTS

| | | |
|---|---|---|
| JP | 2013015161 A | 1/2013 |
| JP | 2013252648 A | 12/2013 |

* cited by examiner

Fig_1
PRIOR ART

Fig_2

*Fig_3*

*Fig_4*

Fig_5

Fig_6

Fig_7

Fig_8

*Fig_9*

*Fig_10*

SYSTEMS AND METHODS FOR JOINING COMPONENTS BY RIVETING

This application is a divisional of U.S. application Ser. No. 15/355,695, filed on Nov. 18, 2006, the entire contents of which are hereby incorporated by reference.

TECHNICAL FIELD

The present technology relates generally to systems and methods for joining parts or workpieces and, more specifically, to systems and methods for interlocking components using a riveting system including a uniquely configured die and rivet. The die and rivet are configured to cause a distal edge or tip of the rivet to, after being forced through both components, turn upwards toward the workpieces, creating a mechanical hook locking the components together.

BACKGROUND OF THE DISCLOSURE

In industries such as consumer electronics, home products and appliances, farming, construction equipment, transportation systems, automotive, aeronautical, and nautical, various manufacturing materials such as aluminum are joined to form relatively lightweight connected parts. Polymeric composites are also being connected to metals or other polymers.

A manufacturer can select materials having favorable characteristics, such as being lightweight, highly-conformable or shapeable, strong, durable, or having a desired texture or color by combining some polymer or composite materials with other materials. An article of manufacture may include various components (e.g., exterior, interior, or decorative features) where materials are selected and configured to withstand, for example, a hot and/or chemically aggressive environment or for painting or chemical resistance over time.

With the increased use of polymers and other low-mass materials, compression molding and post-mold joining techniques, such as laser welding and ultrasonic welding, are also being used more commonly.

Processes for joining similar or dissimilar materials include mechanical joining (e.g., bolts and rivets), fusion joining (e.g., fusion arc welding and laser welding), solid-state joining (e.g., friction-stir welding and ultrasonic welding), brazing and soldering, and adhesive bonding, among others.

Joining materials robustly and without great expense is a challenge. Considerations include chemical, mechanical, and thermal behaviors of materials being joined. When designing a dissimilar-material joint, for instance, factors such as, but not limited to, material thicknesses, surface energy, differences in melting temperature, and thermal expansion/contraction of each material, must be taken into consideration. Differences in material properties of dissimilar materials make weld joining especially challenging and in some cases impossible.

Figure 1:
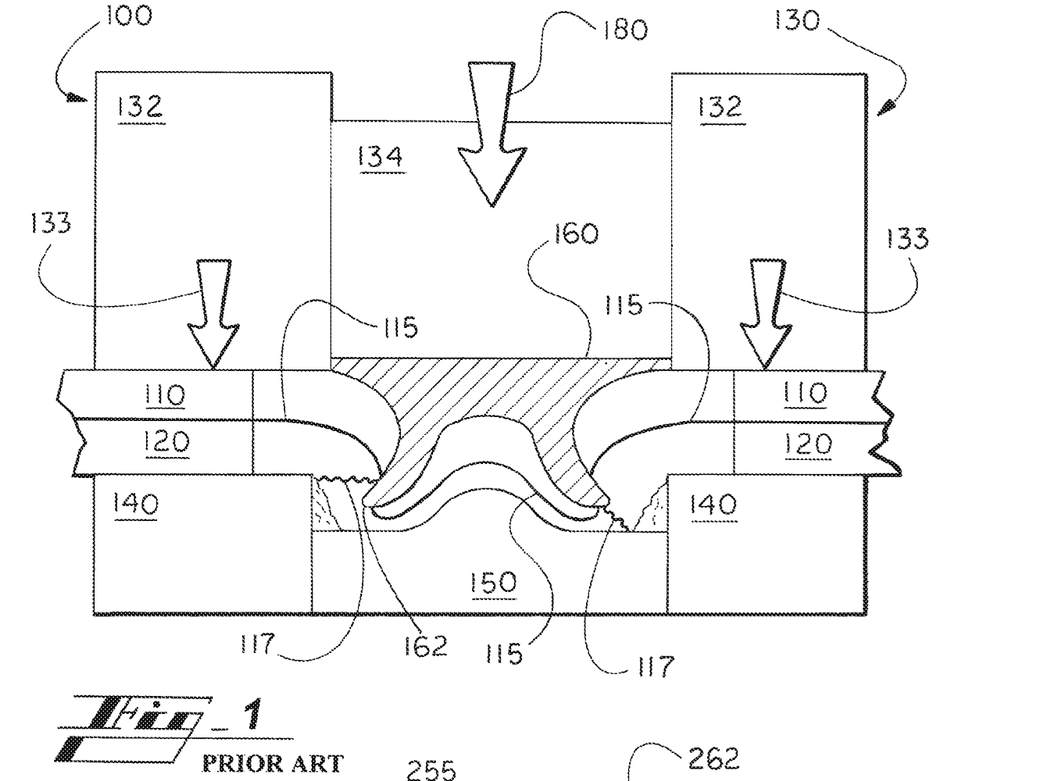
FIG. 1 illustrates a conventional technique for joining workpieces.

Turning to the figures, and more particularly to the first figure, FIG. 1 illustrates a conventional rivet-joining system 100 in use joining a first workpiece 110 to a second workpiece 120.

The system 100 includes a riveting machine 130 including a body 132 and a piston or punch 134 positioned adjacent and movably with respect to the machine body 132. The system 100 includes a base 140, a die 150, and a rivet 160.

In operation, the machine body 132 is positioned adjacent the first workpiece 110 of the workpieces, as indicated by arrow 133 in FIG. 1.

The rivet 160 is positioned between the punch 134 and the first workpiece 110. The punch 134 pushes down on the rivet 160, as indicated by arrow 180, forcing distal tips 162 of the rivet 160 to pierce the workpieces 110, 120, first through a proximate one 110 of the workpieces 110, 120, beyond an interface 115 between the two workpieces 110, 120, and into a distal one 120 of the workpieces 110, 120.

Designers of conventional techniques have had to choose between more cracks or less rivet flaring, each of which lowers joint quality.

Shortcomings of such techniques include the joint having less strength than desired. Traditional techniques also use relatively short rivets, which do not reach through the lower, second workpiece 120. Joint strength is lower than desired when the rivet 160 is kept to shallow depths and not enabled to flare.

Undesired joint strength can also result from unacceptable levels of cracking (e.g., cracks 117) created in the riveting process. Cracking, including micro-cracks and delamination within the workpieces, is possible especially for workpiece materials having relatively low ductility, such as carbon-fiber thermoplastic composites. To avoid cracking, techniques use relatively short rivets 160 to pierce into the second workpiece 120 as little as possible. Also to avoid cracking, materials having a relatively high ductility are typically used, which limits the options for use in the end product.

SUMMARY OF THE DISCLOSURE

Due to the aforementioned deficiencies, the need exists for riveting systems and methods to join workpieces securely, efficiently, and cost-effectively.

In various embodiments, the technology includes a riveting system for use in mechanically linking adjacent workpieces by rivet. The system includes a protrusion having, in profile, opposing protrusion wall segments extending in opposite directions from a peak toward respective transition points. The system also includes at least one trough having a trough surface comprising (i) a trough inner wall, extending from the transition points to a trough bottom and (ii) a trough outer wall, extending from the trough bottom to a trough outer edge.

The opposing protrusion wall segments, in extending from the peak toward the transition points, may extend from a dividing line in opposite directions from the peak toward the transition points. And the trough outer wall may extend out farther at a section than the trough outer edge to, in operation of the die, force a rivet leg to bend so that a rivet tip moves toward the dividing line.

In various embodiments, the protrusion extends farther in a direction than a position of the trough outer edge, so that a proximate workpiece of the workpieces first contacts the protrusion of the die, not first at or directly adjacent the trough outer edge, when the proximate workpiece and the riveting first contact each other in operation of the riveting die.

The height of the protrusion is equal to or greater than a depth of the trough in some cases.

In profile views of various implementations, an entirety of a surface of the trough is curved continuously and/or an entirety of a surface of the protrusion is curved continuously.

The rivet and the die may be part of the same system, such as by being sold or otherwise provided together for use in making the joint. The workpieces may also be part of a system with one or more rivets and/or with the die.

The rivet may have a height greater than a sum of thicknesses, measured along a line of riveting, of the workpieces being linked, so that the rivet can pass fully through the workpieces in operation of the system.

The technology in various embodiments includes a rivet-formed joint. The joint includes a first workpiece, a second workpiece, and the rivet including a rivet head and a rivet leg, wherein the rivet leg extends in a first direction through the workpieces, flares outward, in a second direction perpendicular to the first direction, and turns back toward a third direction generally opposite the first direction, forming a mechanical hook, mechanically linking the first workpiece to the second workpiece.

The rivet leg, after extending in the first, second, and third directions, may extend in a fourth direction generally toward the rivet head.

An entirety of a side of the rivet leg, on a head-side of the rivet leg, is covered with workpiece of the second workpiece in some implementations.

In some cases, a tip of the rivet is disposed within the second workpiece.

The portion of the second workpiece, behind—e.g., beneath—the rivet, is pipped in in some cases, having a convexity corresponding to a shape of a rivet die used with the rivet to form the joint joining the first and second workpieces.

The rivet leg and material of the second workpiece may form a gap or space between them that is closed when viewing the joint in a profile view.

The technology also includes a process for mechanically linking adjacent workpieces using a rivet and a die. The process includes: positioning a second workpiece in contact with the die; positioning the rivet, comprising a head and a leg having a distal edge or tip, adjacent a first workpiece of the workpieces; and applying load to the rivet head, thereby forcing the distal tip to move in pre-determined manners. The tip is forced to (i) pierce through the first workpiece, (ii) pierce through the second workpiece, (iii) contact the die, first at a side wall of a protrusion or an inner wall of a trough of the die, and then along the inner wall of the trough, (iv) flare outward upon reaching a bottom of the trough, (v) flare outward and upward along a lower trough surface toward an outer trough wall, and (vi) move upward along an outer wall of the trough, so that the leg forms a mechanical hook, mechanically linking the adjacent workpieces.

The load is applied generally along a load line and the rivet tip, after flaring outward and moving upward, moves toward the load line in some implementations.

The process further includes receiving, by a controller comprising a processor, from an input device, data indicating load and displacement values for the process.

The process can further include comparing, by the controller, the load and displacement values to a pre-established load/rivet-displacement profile.

The process can further include determining, based on results of the comparing, whether riveting was performed properly.

In some implementations, the process includes initiating, if the riveting was not performed properly, one or both of: communicating an alert and marking a joint arrangement formed by the riveting. The process may include communicating the alert for receipt by personnel, or a computerized or at least electronic device, and/or marking the joined product, such as by stamping or otherwise marking one of the workpieces joined, adjacent the apparently flawed joint or elsewhere.

Other aspects of the present technology will be in part apparent and in part pointed out hereinafter.

The figures are not necessarily to scale and some features may be exaggerated or minimized, such as to show details of particular components. In some instances, well-known components, systems, materials or methods have not been described in detail in order to avoid obscuring the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Specific structural and functional details disclosed herein are not to be interpreted as limiting, but merely as a basis for the claims and as a representative basis for teaching one skilled in the art to employ the present disclosure.

While the present technology is described primarily in connection with automobiles, the technology is not limited to automobiles. The concepts can be used in a wide variety of applications, such as in connection with aircraft and marine craft.

While the technology is described generally with respect to a vertically focused spatial context, wherein the rivet is forced initially generally vertically downward into workpieces being connected, the descriptions herein are not limited to this orientation. The descriptions thus include within their scope other spatial contexts, such as, for example, wherein the rivet is forced sideways, diagonally at any angle, or even upward into the workpieces, with the die being positioned at an opposite side.

I. Overview of the Present Technology

The present technology includes novel dies, for use in joining parts, or workpieces, using a novel mechanical hook.

The die is uniquely shaped to cause a distal edge or tip of the rivet to, after being forced through both workpieces, flare outward and upwards toward the workpieces being joined.

Figure 2:
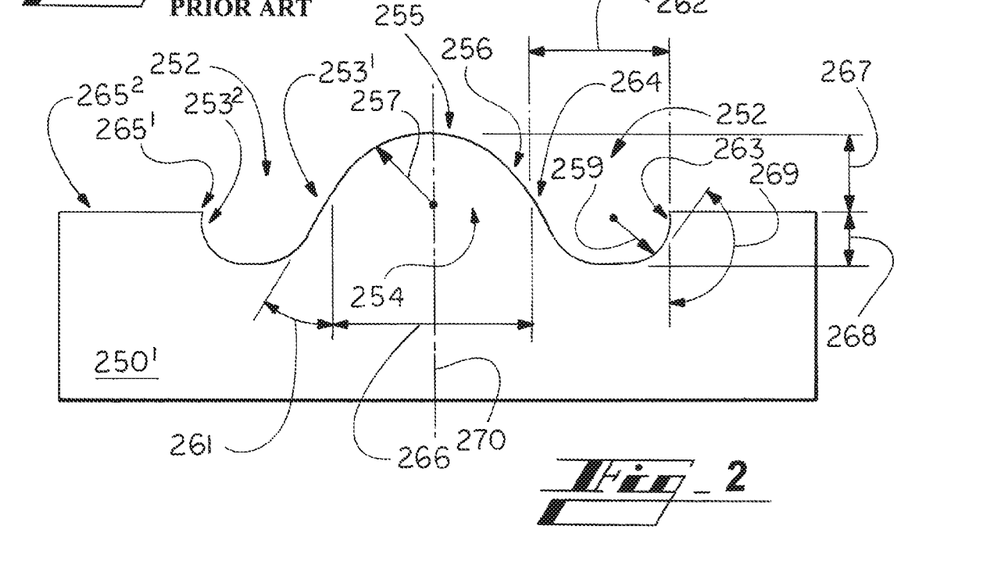
FIG. 2 illustrates a first example riveting die for use in joining workpieces, according to embodiments of the present disclosure.
Figure 3:
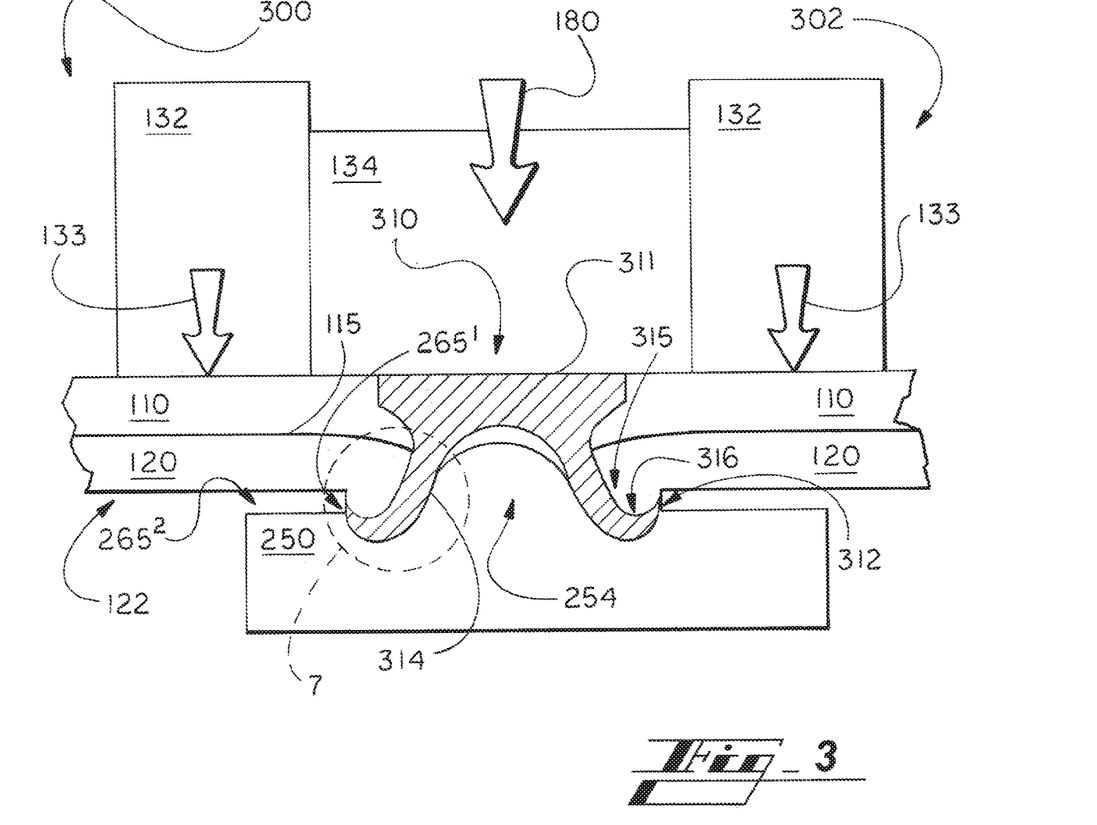
FIG. 3 illustrates workpieces being joined by a rivet using the die of FIG. 2 and a punch machine, according to an embodiment of the present disclosure.
Figure 10:
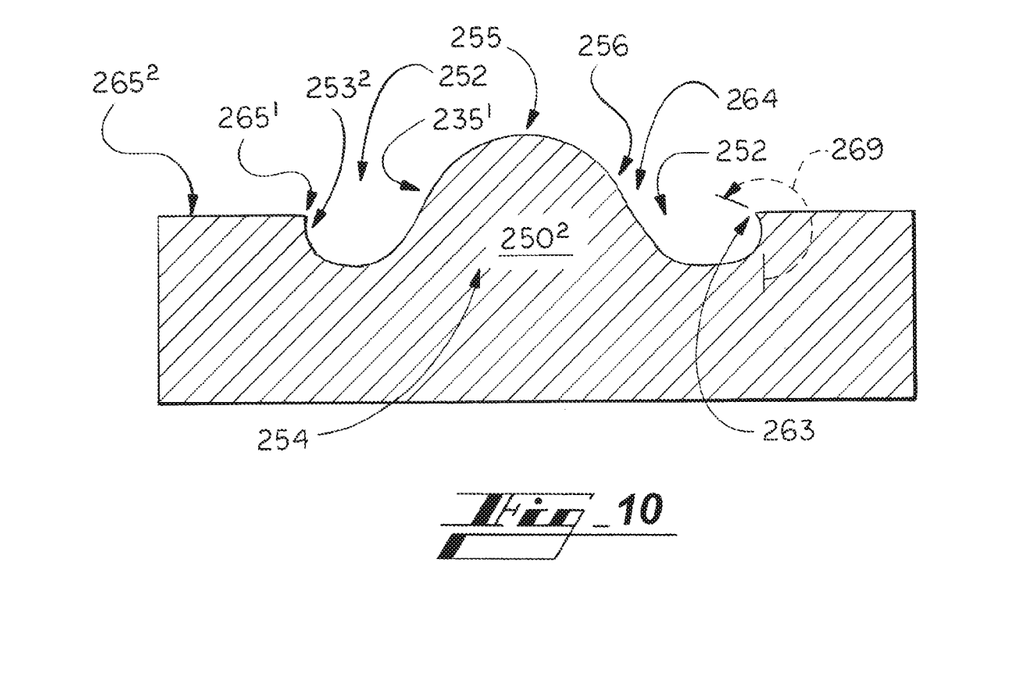
FIG. 10 illustrates a second example riveting die for use in joining workpieces.

II. FIGS. 2, 3, and 10

FIG. 2 illustrates a cross-sectional schematic of a first example die $250^1$ for use in joining workpieces, according to an embodiment of the present disclosure. FIG. 10 illustrates a cross-sectional schematic of a second example die $250^2$ for use in joining workpieces, according to an embodiment of the present disclosure. Each die is at times referred to generically by numeral 250 herein.

The die 250 includes at least one guide trough 252. In various embodiments, the guide trough 252 is generally circular. The trough 252 is positioned adjacent a protrusion 254. In some implementations, the trough 252 can be considered to form a mote around the protrusion 254.

In various embodiments, the protrusion 254 is the highest point on the die 250, as shown in FIG. 2. The protrusion 254 is thus the first portion of the die 250 to contact the second workpiece 120, when the workpieces (e.g., material sheets) 110, 120 and the die 250 are positioned adjacent one another.

In some implementations, the protrusion 254 is the only portion of the die 250 that contacts the workpieces 110, 120. In other implementations, some of the lower workpiece material is pushed down to contact an intermediate point $265^1$ or surface $265^2$ adjacent the guide trough 252, opposite the protrusion 254, as shown in FIG. 3. The intermediate point $265^1$ and surface $265^2$ are between or intermediate the higher elevation of a top of the protrusion 254 and the lower elevation of lower portions of the trough 252.

In various embodiments, the protrusion 254 is partially or generally curved. The protrusion 254 in some cases includes a generally hemispherical portion. The protrusion 254 is not necessarily rounded perfectly in all places. In various embodiments, at least a portion of a surface 255 of the protrusion 254 is formed along one or more radii 257. As an example, the radius 257 can be in the range of about 1.5 mm to about 2.0 mm.

The radius 257, like all die dimensions, can also be represented in terms of another die dimension. For example, the radius is represented as a percentage, fraction, ratio, or multiple of overall die height, rivet height, workpiece(s) thickness(es), etc.

The guide trough 252 is partially or generally curved. In various embodiments, at least a portion of a surface of a trough side 253 (including $253^1$ and $253^2$) of each guide trough 252 is formed along one or more radii 259.

In various embodiments, for use with thermoplastic workpieces 110, 120, for instance, the radius 259 can be in the range of about 0.7 mm to about 1.0 mm.

The trough 252 includes an inside or interior wall $253^1$ connected to the side wall 256 of the protrusion 254.

Figure 7:
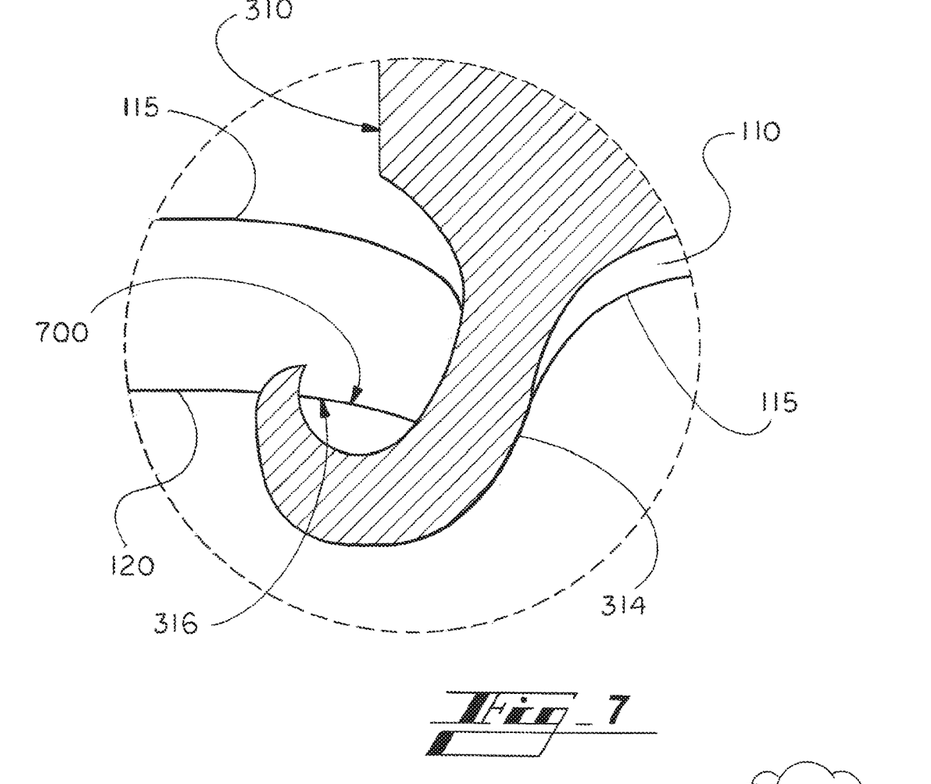
FIG. 7 shows an alternative hook mechanism.

As described more below, in use of the die 250, a distal edge or tip 312 of a rivet 310 (FIG. 3) will, after being forced to pierce through the workpieces 110, 120, first contact the die 250 at the trough inside wall $253^1$ or the protrusion side wall 256. In FIG. 3, the area including the hook and its distal tip 312 is called out by reference numeral 7, indicating that the area is shown in FIG. 7.

In some embodiments, the inside wall $253^1$ is slightly rounded or generally flat. The trough inside wall $253^1$ transitions to the protrusion side wall 256. In some embodiments, the protrusion side wall 256 is slightly curved or generally flat. In some embodiments in which both walls $253^1$, 256 have curved portions, the respective curved portions bend generally in opposite directions, with there being no bend at a point where the walls $253^1$, 256 connect. The trough inside wall $253^1$ can, for instance, bend, even if very slightly, in an opposite direction than the bend of the adjacent protrusion side wall 256.

The transition between the walls $253^1$, 256 can occur at or adjacent an elevation of the die 250 corresponding to the intermediate point $265^1$ or surface $265^2$.

The inside wall $253^1$ of the trough 252 can extend with respect to vertical at any of a wide variety of angles 261. The angle 261 can also or instead be considered to describe an angle by which the wall 256 of the protrusion 254 extends with respect to vertical, and/or an angle of the die 250 at a transition between the inside wall $253^1$ of the trough 252 and the protrusion side wall 256, as can be appreciated by FIG. 2. While the die 250 can have other angles 261, here, in various embodiments the angle 261 is between about 45 degrees and about 60 degrees. Such angle range may be beneficial for implementations joining thermoplastic workpieces. For implementations joining metal, for instance, the angle 261 may be smaller, such as between about 35 degrees and about 50 degrees. For thermoplastic composites, it appears beneficial to have a larger relative angle 261, to flare the rivet leg outward more easily, then upward through the lower workpiece 120.

An area of the die 250 being at and/or adjacent the transition can be referred to as an initial contact area, because the distal edge 312 of the rivet 310 will first contact the die 250 there during riveting.

In a contemplated embodiment (not shown in detail), the rivet 310 includes multiple legs that join the workpieces 110, 120. A distal tip of each leg would be forced to pierce through the workpieces 110, 120 and into contact with the die 250, at which point the legs would, starting at the tips, each flare outward, then upward, and possibly from there, slightly inward. The potential for rivet leg(s) to move inward some, after moving upward, is described further below.

The guide trough 252 includes a width 262. The width 262 can be measured between an outer edge 263 of the trough 252 and an inner edge 264 of the trough 252. The trough side 253 reaches the intermediate point $265^1$ of the die 250 at the outer edge 263 of the trough 252.

While the guide trough 252 can have other widths 262 without departing from the present disclosure, in some embodiments the width 262 is between about 3 mm and about 4 mm. If the width 262 is too large, cracking may be promoted and/or damage to the distal edge of the rivet 310.

For implementations in which metal is joined, the width 262 can be can be the same or higher, such as between about 3 mm and about 5 mm. It should be appreciated that for all dimensions described herein, such as lengths, widths, and thicknesses, depend on the scale of implementation. For thicker workpieces, for instance, longer rivets 310 and larger die 250 would be appropriate.

In a contemplated embodiment, the die $250^2$ is configured so that the outer side $253^2$ of the trough 252 moves upward, then turns inward at the outer edge 263, as shown in FIG. 10. The outer wall $253^2$ extends from a bottom of the trough 252, generally upward, and then briefly toward the protrusion 254.

The outer wall $253^2$ of the die 250 (e.g., the first or second example die $250^1$, $250^2$) extends at an angle 269 with respect to vertical. While the guide trough 252 can have other outer-wall angles 269 without departing from the present disclosure, in some embodiments the outer-wall angle 269 starts at about 90 degrees, adjacent a bottom of the trough 252 and bends or otherwise extends to about 180 degrees at or adjacent the outer edge 263. In embodiments like that shown in FIG. 10, the wall further extends at the edge 263 so that the angle 269 goes beyond 180 degrees at or adjacent the outer edge 263. As can be seen, the trough outer wall extends beyond the trough outer edge 263. Or in other words, the outer edge 263 overlaps a portion of the outside wall $253^2$, and in some cases overlaps a portion of the trough bottom. In operation of the die $250^2$, this geometry forces a rivet leg 314 to bend so that the rivet distal edge 312 moves toward a dividing line of the riveting die. The dividing line can be, for instance, a center line extending through the protrusion, vertically in the example views shown, such as the dividing line shown in FIG. 2.

The protrusion 254 includes a width 266 (FIG. 2). The width 266 can be measured between central-portion edges, where the protrusion 254 reaches the intermediate surface 265. While the protrusion 254 can have other widths 266 without departing from the present disclosure, in some embodiments the width 266 is between about 2 mm and about 2.5 mm.

For implementations joining metal workpieces 110, 120, the width 266 can be the same or higher, such as between about 2 mm and about 3 mm. For thermoplastic composites, the width 266 could be smaller, such as below 2 mm or within a range including the lower end of the 2-3 mm range, to minimize the cracking of the dismal edge of the rivet 310.

Each protrusion 254 includes a height 267 (FIG. 2), measured, in some implementations, from the intermediate point $265^1$ or surface $265^2$ to a peak or tip of the protrusion. The protrusion 254 is convex, extending above the intermediate point $265^1$ or surface $265^2$. In a contemplated embodiment the height is measured from about the transition point 264 to the peak of the protrusion 254.

The protrusion 254 can be configured and arranged in the die 250 so that when the workpieces 110, 120 are placed on the die 250, contacting the protrusion 254, and pressure applied on the workpieces (e.g., arrow 133 and/or arrow 180 in FIG. 3), the protrusion 254 pips, or is pushed, up into the lower workpiece 120. The resulting position is shown by way of example in FIG. 3.

The pipping promotes flaring or forking of distal ends of the rivet legs 314, forming rivet feet. The feet, when pushed outward and upward, form a mechanical hook, to mechanically lock the two workpieces 110, 120 together.

While the protrusion 254 can have other heights 267 without departing from the present disclosure, in some embodiments, the height 267 is between about 0.2 mm and about 0.4 mm.

For implementations joining metal workpieces 110, 120, the height 267 can be the same or larger, such as between about 0.25 mm and about 0.5 mm. For joining thermoplastic-composite workpieces 110, 120, a lower relative height 267, such as below 0.2 mm, or a range including a lower end of the 0.25-0.5 mm range, could minimize upsetting of any of the rivet 130 (e.g., walls or side of the rivet) and connection between the rivet 130 and one or more of the workpieces 110, 120.

Each trough 252 includes a depth 268, measured, in some implementations, from an intermediate surface 265. While the trough 252 can have other depths 268 without departing from the present disclosure, in some embodiments the depth 268 is between about 1.0 mm and about 2.0 mm.

For implementations joining metal workpieces 110, 120, the depth 268 can be larger, such as between about 1.5 mm and about 2.2 mm. For thermoplastic composite, a smaller depth, such as below 1.5 mm or within a range including a lower end of the 1.5-2.2 mm range, may help avoid cracking of the lower workpiece 120.

The height 267 of the protrusion 254 and the depth 268 of the trough 252 can be defined as ratios of each other. For instance the height 267 and depth 268 in various embodiments have a one-to-one (1:1) ratio, wherein the height and depth are the same. In some embodiments, the height 267 is greater than the depth, such as by being 1.2, 1.3, 1.4 or 1.5 times greater the depth 268.

For various implementations in which metal workpieces 110, 120 are joined, the height 267 is smaller than the depth 268. For example, a ratio of the height to the depth 268 can be between about 1:9 and about 1:3—for instance, the height 267 being about 0.25 mm and the depth being about 0.5 mm. A larger ratio may minimize cracking of the lower workpiece 120 and minimize upsetting of the rivet in riveting (e.g., of thermoplastic composites)—the ratio can be, for instance, between about 1:5 and about 1:2.5.

III. FIGS. 3, 5, 7, and 10

FIG. 3 illustrates schematically a cross section of a rivet-joining system 300 in use joining the first workpiece 110 to the second workpiece 120. While the present disclosure describes primarily connecting two workpieces 110, 120, the disclosure encompasses embodiments in which more than two workpieces are connected by the rivet and the die of the present technology.

The workpieces 110, 120 can each include one or more materials, and in various embodiments include the same material(s) as each other, or different material(s). Example materials include polymeric composites, such as a carbon-fiber reinforced nylon composite, and include one or more metals, such as aluminum.

The system 300 includes a riveting machine 302. The machine 302 in various embodiments can be like the machine 130 described above in connection with FIG. 1, having a body 132 and a piston or punch 134 positioned adjacent and movably with respect to the machine body 132. In other embodiments, another source of riveting force, such as a person or other machine (e.g., robotic machine), sufficient for performing needed punching or pushing function, is used.

The system 300 includes the novel die 250 and a novel rivet 310. In various embodiments, the die 250 is a stand-alone sub-system or system that can be provided with one or more rivets 310. In various embodiments, the rivet 310 is a stand-alone sub-system or system that can be made and/or sold on its own or with the die 250.

In operation, the machine body 132 is positioned adjacent a first workpiece 110, and can be arranged to contact or apply downward force on the workpiece 110, as indicated by arrow 133 in FIG. 3.

The rivet 310 is positioned beneath the punch 134 and above the workpieces 110, 120. The punch 134 strikes or is otherwise pushed down on the rivet 310, as indicated by arrow 180, forcing the distal edge 312 of the leg 314 of the rivet 310 to pierce the workpieces 110, 120—first through a proximate one 110 of the workpieces 110, 120, beyond an interface 115 between the two workpieces 110, 120, and on into a distal one 120 of the workpieces.

The area in FIG. 3 including the hook and its distal tip 312 is called out by reference numeral 7, indicating that the area is shown in FIG. 7.

In some implementations, depending on characteristics of the system (e.g., workpiece material, thickness, rivet dimensions, etc.), some of the lower workpiece 120 is pulled down with, or otherwise displaced by movement of, the rivet 310, below a lower surface 122 of the workpiece 120. Material indicated by reference numeral 316 in FIG. 3 includes this displaced material.

In some embodiments, a washer or shim (not shown) is positioned between a portion of the rivet (e.g., rivet head) and the workpiece. Additionally or alternatively, a larger (e.g., wider) rivet head can be used for similar purposes. Purposes include distributing more broadly any forces being transferred from the rivet 310 to the workpieces 110, 120. The shim bears load that would otherwise be passed to the adjacent workpiece 110. By distributing the forces, the workpieces 110, 120, or at least the upper workpiece 110 is put under less stress during the riveting. Joints resulting from the larger head or shim can be stronger than those formed without the larger head or shim. The benefit is described more below in connection with FIG. 9.

While the rivet 310 can include other materials without departing from the scope of the present disclosure, in various embodiments the rivet 310 includes a metal such as steel (austenitic or martensitic), aluminum, or copper, thermoplastics, any composite, alloy, the like, or other.

The die 250 and/or the rivet 310 are/is configured (e.g., height, shape) so that the rivet 310, after being forced through both workpieces 110, 120, contacts the trough 252 and, in response to the contact, flares outward and then upwards toward the workpieces 110, 120, such as depicted in FIG. 3. As provided, the die 250 configuration promoting flaring can include the protrusion 254 extending above an intermediate point $265^1$ or surface $265^2$.

While the rivet 310 can have other heights—measured prior to piercing, from a top of rivet head 311 to the rivet distal edge 312—without departing from the scope of the present disclosure, in various embodiments the rivet 310 has a height between about 8 mm and 15 mm. Generally, the rivet height can be selected based on factors including a thickness of the workpieces being joined and dimensions of the die 250.

In some embodiments, the rivet 310 has pointed distal edges 312 to limit stress on the workpieces 110, 120 in piercing. The edges 312 are preferably as sharp as possible for this purpose.

In one aspect, one or both workpieces 110, 120 are pre-heated to soften the material prior to riveting, thereby reducing stress caused by the riveting.

The rivet dimensions and materials, including leg thicknesses, are configured according to required performance characteristics. The dimensions, and material, are selected so that the leg 314 has sufficient strength to withstand the initial piercing, and sufficient ductility to flare and bend after the piercing. The dimensions and materials are also selected to promote a robust, strong resulting joint. The dimensions and material should be selected so that the mechanical hook formed is strong, for instance.

The rivet height can be represented by various ratios. The height can be, for instance, between about 1.5 and about 2 times the combined thicknesses of the workpieces 110, 120 being joined. The ratio in some implementations is even greater.

While the workpieces 110, 120 can have other thicknesses (measured vertically in FIG. 3) without departing from the scope of the present disclosure, in various embodiments each has a thickness of about 2.5 mm. In various embodiments, each has a thickness of between about 2.0 mm and about 3.0 mm.

The hook mechanism 315 fostered by the flaring creates a mechanical lock, beyond other mechanical connections between the rivet 310 and the workpieces 110, 120, such as friction between the workpieces 110, 120 and intermediate portions of the rivet legs 314. The hook mechanism 315 may pinch material of the lower workpiece 120 and/or push material of the lower workpiece 120 upward in the riveting process. Such material is indicated by reference numeral 316 in FIGS. 3 and 7.

As described above, the outer wall $253^2$ extends or bends generally upward along a line, or has a tangent, being at an angle 269 (FIG. 2). The angle 269 is in various embodiments about 180 degrees in association with at least one point of the outer wall $253^2$. As provided, in a contemplated embodiment, the outer wall $253^2$ further extends or bends beyond vertical, to an angle 269 greater than 180 degrees, as shown in FIG. 10.

Figure 5:
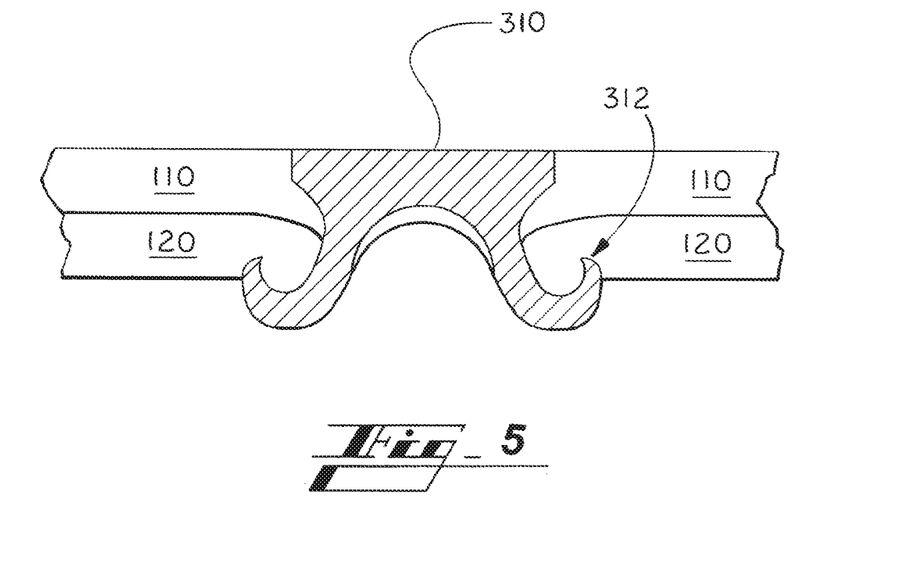
FIG. 5 illustrates the workpieces after being joined by an operation similar to that shown in FIG. 3, except that the rivet edge is pushed inward after being flared outward and upward.

The rivet 310 in such implementations can have sufficient configuration (e.g., have sufficient height), and the die 250 configured (e.g., dimension) so that the distal edge 312 is forced to flare out, by the inside wall $253^1$ and bottom of the trough 252, upward by the outside wall $253^2$, In some implementations, the distal edge 312 can to some extent extend laterally, back toward the protrusion 254. An example resulting connection is shown in FIG. 5. The rivet leg 314 can turn inward in some embodiments, even if the trough edge 263 does not curl inward like the die $250^2$ shown in FIG. 10.

In various embodiments, the hook mechanism 315, when formed, partially surrounds and supports a portion 316 of the material of the second workpiece 120. In the vertical context, the material 316 would be above the hook mechanism 315. In any orientation, material 316 of the workpiece 120 can be considered to be on a rivet-head side of the hook mechanism 315.

In these ways, the hook mechanism 315 creates a robust mechanical connection between the rivet 310 and the workpieces 110, 120, and between the workpieces 110, 120 being joined. The resulting connections are greater than those created by conventional riveting techniques.

In a contemplated implementation, the die 250 and rivet 310 are configured so that a gap 700 (FIG. 7) is formed between the rivet leg 314 and the second workpiece 120 as the distal edge 312 is pushed through the workpiece 120, flared outward and upward. The gap 700 can become closed in this way.

The gap 700 can, after the gap is formed by the hook mechanism 315, be reduced in size, or be substantially eliminated, if the distal edge 312 of the rivet 310 continues to be forced into the second workpiece 120. As shown in the profile view of FIG. 3, the gap or space may be closed.

Figure 4:
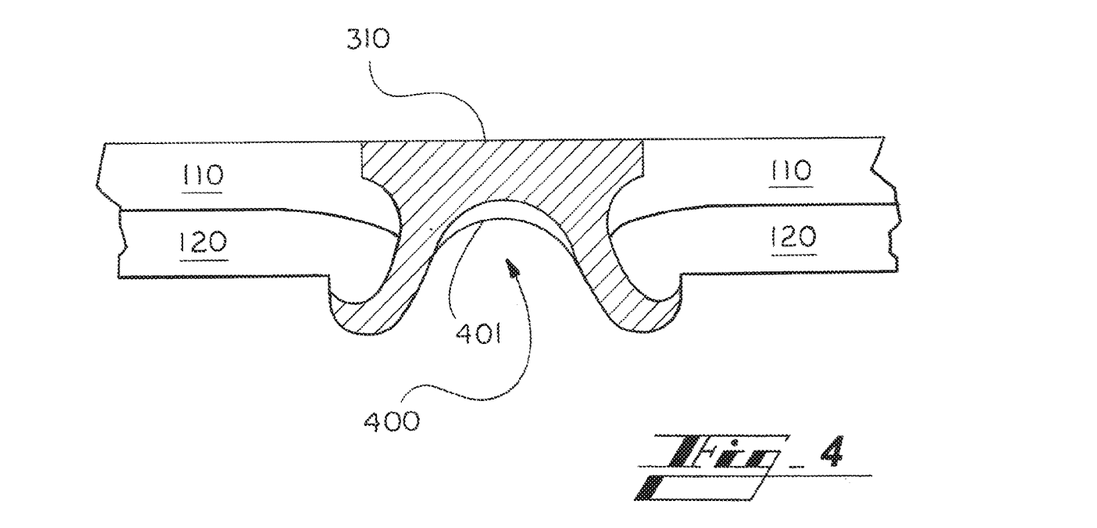
FIG. 4 illustrates the workpieces after being joined by the operation shown in FIG. 3, with the punch machine and die removed, with the rivet edge flared outward and upward.

IV. FIG. 4

FIG. 4 illustrates the workpieces 110, 120 joined by the operation shown in FIG. 3, after the workpieces are removed from the punch machine 302 and die 250.

A depression in the lower workpiece 120, or both workpieces 120, 110, formed by the protrusion 254 of the die 250 pipping into the second workpiece 120, as described above, is referenced by numeral 400 in FIG. 4. Reference numeral 401 calls out some of the material of the lower workpiece 120 pushed up by the protrusion of the die.

V. FIG. 5

FIG. 5 illustrates the workpieces 110, 120 joined by an operation like that shown in FIG. 10, or like that shown in FIG. 3 wherein the rivet 310 and the die 250 are configured so that the distal edge 312 of the rivet 310 flares generally laterally outward, then generally upward, and then further generally laterally inward, as described above.

Figure 6:
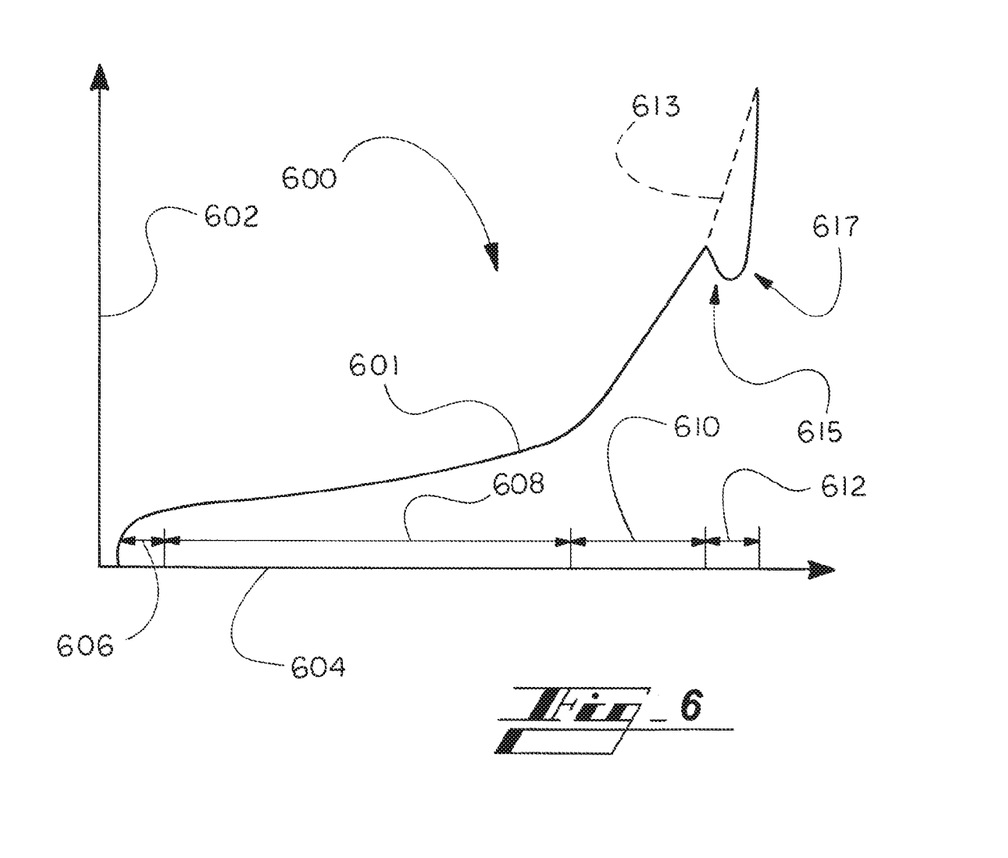
FIG. 6 shows an example load-displacement chart.
Figure 8:
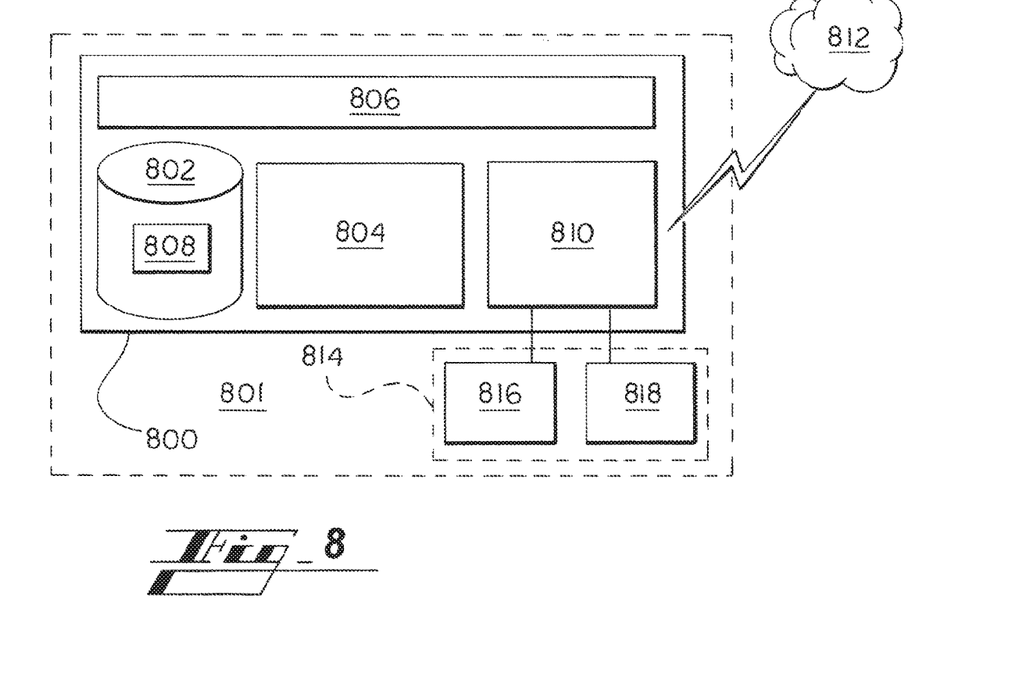
FIG. 8 shows a controller specially configured for using force signals from a riveting process to evaluate the process, including comparing the signal to a pre-established load/rivet-displacement profile like that of FIG. 6.

VI. FIGS. 6-8

FIG. 6 shows an example load/rivet-displacement chart 600, showing a relationship between an input force, or load, applied to the rivet 310 during riveting, and rivet displacement into the workpieces 110, 120. The y-axis 602 represents load or force, applied on the rivet, and the x-axis 604 represents rivet displacement. The example load-displacement profile or signature is indicated by reference numeral 601.

Riveting processes can be evaluated or monitored in real time by comparing feedback signal or data indicating actual load and displacement during each riveting to a load-displacement profile 601.

The feedback can be received at a performing controller or computer from sensors or other components being part of or connected to the riveting machine 302. A component (e.g., sensor) can be configured to sense displacement of the piston or punch 134, for instance, which correlates to rivet displacement. A component can also be configured to sense an amount of load required, or being transferred to the rivet 310 in order to push the rivet 310 at each instance. When resistance to pushing the rivet 310 increases, the height of the profile line 601 increases.

Many existing riveting machines, such as servo machines, output displacement values as part of their normal operation. An example component measuring load is a load cell, or pressure or force transducer.

The load-displacement profile 601, like all terms used in the present disclosure, can be replaced by similar words. Other terms include force-displacement profile, force-displacement signature, and load-displacement signature. The profile 601 can be created in any of a variety of ways, including by test riveting or computer computations such as including a simulation.

With further reference to the example signature 601 of FIG. 6, the riveting process can be divided into four (4) primary phases, which can overlap to some degree: establishment or clamping 606, piercing 608, flaring 610, and interlocking 612.

In the establishment phase 606, the riveting machine 302 engages the rivet 310 and begins to apply load. In this phase, the machine 302 begins to apply load on the rivet 310 towards overcoming static impediments to piercing such as surface tension atop of the first workpiece 110. Accordingly, rivet displacement is initially nil to low, and begins to increase as the process proceeds into the piercing phase 608.

In the piercing phase 608, sufficient load is applied to the rivet 310 to force rivet legs 314 to pass through the first workpiece 110, and then the second workpiece 120. In the piercing phase 608, the distal edge 312 of the leg 314 passes completely through the second workpiece 120, toward a bottom of the die trough 252. A slope of the protrusion 254 can guide the distal edge 312 of the leg 314 into the trough 252.

With continued load from the riveting machine 302, the flaring phase 610 begins. In the flaring phase 610, the distal edge 312 flares out, laterally outward along the die trough inner wall $253^1$. The flaring continues along lower portions of the trough 252, and eventually the outer wall $253^2$ of the trough 252.

After or toward the end of the flaring, the interlocking phase 612 begins.

The dashed portion 613 of FIG. 6 shows how the signature 601 varies in the novel interlocking phase 612 from the slope pattern developed in the preceding two phases 608, 610. More particularly, the signature 601 includes a unique dip 615 corresponding to a stage of the riveting process in which the distal edge 312 of the rivet 310 passes out of the lower workpiece 120. At that point, displacement continues while required force decreases.

After the rivet edge 312 exits the workpiece 120 (starting the dip 615), the rivet 310 engages the side of the protrusion 254 or trough 252. With the engagement, the required force on the rivet 310 to continue rivet displacement increases accordingly, and is indicated by the increase of the force value at ramp up 617.

In the ramp up 617, the rivet leg 314 is flared outward, and then upward, and in some cases also then inward.

The analyzing controller can be a specially configured computing device, configured with code causing a processor of the controller to perform the comparison. An example controller 800 is shown in FIG. 8 and described further below.

In determining whether a present riveting was performed properly, the controller 800 compares an actual load-displacement profile for the present riveting to the pre-established load-displacement profile shown at 601 or another such pre-set load-displacement profile. The comparison does not need to include comparing all parts of an actual load-displacement profile for the present riveting to the pre-established load-displacement profile 601. The comparison determines, for instance, whether the actual load-displacement profile includes the dip 615 described. If it does not, then the rivet 310 may not have pierced through the lower workpiece 120 for some reason. Example reasons include the selected rivet being too short or the rivet being too soft to pierce through one or both workpieces 110, 120. As another example, the rivet leg 314 may for some reason have flared while the edge 312 was still within the first or second workpiece 110, 120, instead of after having passed through both workpieces.

Further in determining whether a present riveting was performed properly, the controller 800 can determine whether the actual load-displacement profile includes the ramp back up 617 described. If it does not, then the rivet 310 may not have flared and hooked for some reason. Example reasons include a rivet tip breaking, or unintended absence of the die.

In various embodiments, the comparison includes determining whether the dip 615 and the ramp up 617 are present, or whether a dip 615 and a ramp up 617 identified have sufficient shape (e.g., slope, magnitude). The determining can in some implementations be performed without literally comparing the actual profile to the pre-established profile. The pre-established profile can be represented in other ways, for instance, such as data points, thresholds, or the like, that actual riveting load-displacement data can be compared to in order to determine whether the dip 615 and ramp up 617 are present, or whether a dip 615 and a ramp up 617 identified have satisfactory shape.

The controller 800 can be configured to, in response to determining that the actual load-displacement of a present riveting does not match the predicted load of the pre-determined load-displacement profile 601, and/or simply that the dip 615 and ramp up 617 was not present or sufficiently present—i.e., that the rivet did not become positioned as planned—initiate provision of a notification or alert. Example alert actions include transmitting a fail or warning signal a light or other display device of the system, or to another computing device and/or local personal device, in any of these cases causing a light to illuminate or speaker to sound, for instance.

In a contemplated embodiment, a part failing the comparison is tagged or marked to indicate insufficient joining. The indication can be arranged to indicate the area of the questionable rivet, such as by a stamp or workpiece indentation.

The controller 800 can be implemented in any of a variety of ways, including by being a part of any of a wide variety of greater systems 801, such as a laptop, tablet, other mobile communications device, or a riveting robot or other machine. Although connections are not shown between all of the components illustrated in FIG. 8, the components can interact with each other to carry out system functions.

As shown, the specially configured controller 800 includes a memory, or computer-readable storage device 802, such as volatile medium, non-volatile medium, removable medium, and non-removable medium. The term computer-readable media and variants thereof, as used in the specification and claims, refer to tangible or non-transitory, computer-readable storage devices.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The specially configured controller 800 also includes a computer processor 804 connected or connectable to the computer-readable storage device 802 by way of a communication link 806, such as a computer bus.

The processor 804 could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. References herein to processor executing code or instructions to perform operations, acts, tasks, functions, steps, or the like, could include the processor performing the operations directly and/or facilitating, directing, or cooperating with another device or component to perform the operations.

The computer-readable storage device 802 includes the aforementioned computer-executable instructions, or code 808. The computer-executable instructions 808 are executable by the processor 804 to cause the processor, and thus the specially configured controller 800, to perform any combination of the computing functions described in the present disclosure.

The specially configured controller 800 further comprises an input/output (I/O) device 810, such as a wireless transceiver and/or a wired communication port. In some embodiments, the processor 804, executing the instructions 808, sends and receives information, such as in the form of signals, messages or packetized data, to and from one or more communication networks 812, such as an intranet or internet, for communicating riveting process or riveting machine data to another computer.

The specially configured controller 800 includes or is connected to one or more local input/output devices 814, including at least one local input device 816 and/or one or more local output devices 818. The inputs 816 can include the sensors or components measuring actual loads and displacements in rivetings, as mentioned. Local output devices 818 can include a separate local computing system or an automated system, such as the riveting machine 302 or robotics equipment controlling the riveting, placement of one or more subject implements (e.g., workpieces and/or rivets), and/or moving the resulting joined workpieces. Outputs to the device(s) 818 can also include the alert structure mentioned above.

Figure 9:
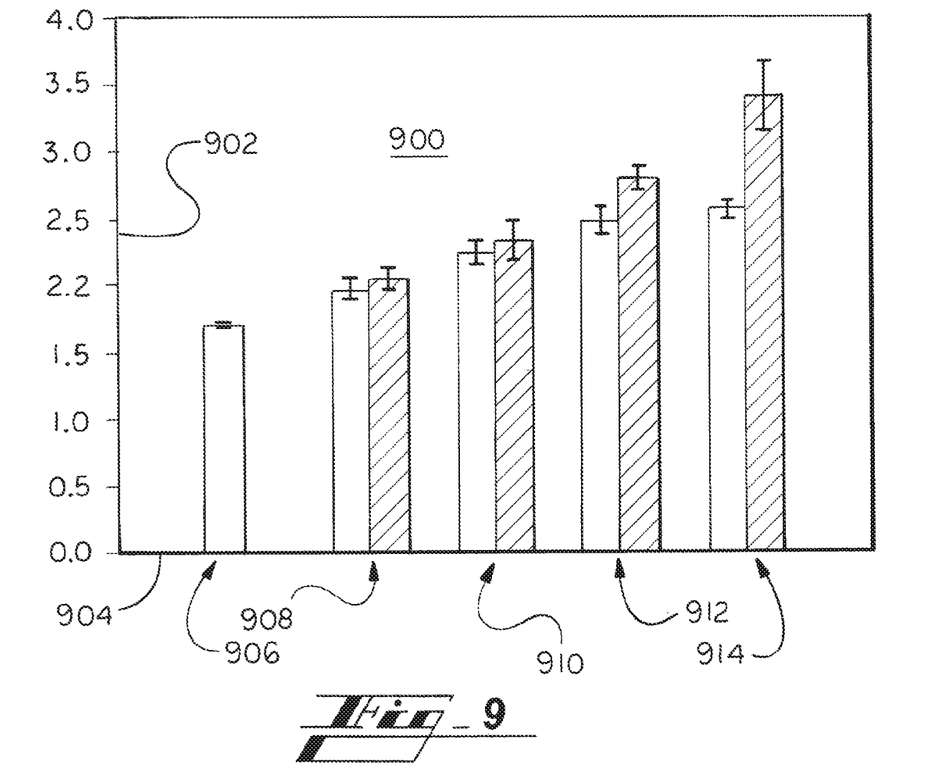
FIG. 9 shows example joint strength values for rivets of different heights, with and without a washer.

VII. FIG. 9

As discussed above, a washer or shim can be positioned between a portion of the rivet (e.g., rivet head) and the workpiece, when the rivet is punched into the workpieces. Additionally or alternatively, a larger rivet head can be used for similar purposes—to distribute more broadly any forces being transferred from the rivet to the top workpiece 110. The shim or larger head can keep the rivet 310 from digging into the adjacent workpiece 120. By distributing the forces, the workpieces 110, 120, or at least the upper workpiece 110 is put under less stress in the riveting.

FIG. 9 shows a chart 900 of example joint strength values for rivets of different heights, and with and without a washer.

For preparing the chart 900, an amount of force required to separate a joint after it is formed using the various rivets, and with and without a washer, was measured. The y-axis 902 represents the amount of separation force. In the example testing, the separation force is measured in kilonewtons (kN).

The various rivet arrangements are arranged along the x-axis 904. The arrangements include data 906 for a 7 millimeter (mm) rivet, data 908 for an 8 mm rivet, data 910 for a 9 mm rivet, data 912 for a 10 mm rivet, and data 914 for an 11 mm rivet.

The solid columns represent the separation forces for the respective rivets when a washer or shim is not used. The hashed columns represent the separation forces for the rivets when a washer is used.

The I bars at the top of each column indicate a range, or margin of error, resulting from various measurements.

As shown, the tests indicate that joints were stronger when a washer or shim is used over a base rivet head size. It is contemplated that the same, similar, or better results would follow using a rivet head that is larger, such as having the size corresponding to the shim, as compared to the base size.

As also shown, the tests indicate that joints were stronger when a longer rivet was used, such as a rivet presenting a greater rivet-to-workpiece thickness ratio. It is contemplated that this effect results at least, in part, to the increased footing created by a larger mechanical hook. Once the rivet has pierced through the second workpiece 120, stress on the workpieces 110, 120 is greatly reduced. Thus, the benefits of additional joining activity after the pierce-through are enjoyed with little or no weakening of the workpieces 110, 120. While a longer rivet has been found advantageous, it is contemplated that there are limits, including space limitations to using still longer rivets, and expected that there is an ideal height, longer than traditional rivets for joining workpieces, can be determined by a designer corresponding to each context—e.g., workpiece thickness, material, etc.

VIII. Select Benefits of the Present Technology

Many of the benefits and advantages of the present technology are described above. The present section restates some of those and references some others. The benefits described are not exhaustive of the benefits of the present technology.

Connection between the rivet 310 and workpieces 110, 120 is greater than connections possible using conventional riveting techniques. Connection fostered between the workpieces 110, 120 is also greater than connections possible using conventional riveting techniques.

Overall static strength of the resulting joint (e.g., FIG. 4) is increased markedly as compared to prior techniques. The higher strength results from a number of factors, such as the mechanical hook formed and, in some embodiments, the shim or larger head used.

Potential for cracking in the lower workpiece 120 between the rivet 310 and an edge of the workpiece 120 (e.g., 117 in FIG. 1) is eliminated or at least greatly reduced as compared to some prior techniques. Less or no cracking can be promoted by having rivet legs 314 flare after the rivet distal edge 312 exits the lower workpiece 120, as compared to conventional techniques in which the distal edge never leaves the second workpiece 120 and, thus, if the rivet leg flares, the distal edge of the rivet flares while still in the workpiece 120. Less or no cracking can also be promoted by using sharper rivets (e.g., ultra-sharp rivet edges). Less or no cracking can also be promoted by using shims or rivets with larger heads. An ancillary benefit of the present techniques allowing less or no cracking, is that less-ductile materials can be used as compared with many prior techniques, which were limited to using materials of relatively high ductility.

IX. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A rivet-formed joint comprising:
   a first workpiece;
   a second workpiece; and
   a rivet comprising a rivet head and a rivet leg, wherein the rivet leg extends in a first direction through the workpieces, flares outward, in a second direction perpendicular to the first direction, and turns back toward a third direction generally opposite the first direction, forming a mechanical hook, mechanically linking the first workpiece to the second workpiece, wherein the rivet leg and a material of the second workpiece form a space between them that is, in profile, closed.

2. The rivet-formed joint of claim 1, wherein the rivet leg, after extending in the first, second, and third directions, extends in a fourth direction generally toward the rivet head.

3. The rivet-formed joint of claim 1, wherein an entirety of a side of the rivet leg, on a head-side of the rivet leg, is covered with workpiece of the second workpiece.

4. The rivet-formed joint of claim 1, wherein a tip of the rivet is disposed within the second workpiece.

5. The rivet-formed joint of claim 1, wherein a portion of the second workpiece, behind the rivet, is pipped in, having a convexity corresponding to a shape of a rivet die used with the rivet to form the joint joining the first and second workpieces.

6. A rivet-formed joint comprising:
   a first workpiece;
   a second workpiece having an interface surface facing the first workpiece and an opposed back surface; and
   a rivet comprising a rivet head and a rivet leg, the rivet head being implanted in the first workpiece and the rivet leg extending from the rivet head and through the second workpiece, the rivet leg flaring outwardly and upwardly to form a hook portion of the rivet leg in which a distal tip of the rivet leg penetrates into the back surface of the second workpiece, wherein a gap is formed between the back surface of the second workpiece and the hook portion of the rivet leg.

7. The rivet-formed joint of claim 6, wherein the distal tip of the rivet leg curls inwardly back towards the rivet.

8. The rivet-formed joint of claim 6, wherein material from the second workpiece is displaced below the back surface of the second workpiece and is supported from below by the hook portion of the rivet leg.

9. The rivet-formed joint of claim 8, wherein the hook portion fully surrounds the material from the second workpiece that is displaced below the back surface of the second workpiece.

10. The rivet-formed joint of claim 6, wherein a height of the rivet, measured from a top of the rivet head to the distal tip of the rivet leg, is 1.5 to 2 times of a combined thickness of the first and second workpieces.

11. The rivet-formed joint of claim 6, wherein the hook portion of the rivet leg mechanically pinches or pushes the second workpiece towards the first workpiece.

12. A rivet-formed joint comprising:
   a first workpiece;
   a second workpiece having an interface surface facing the first workpiece and an opposed back surface; and
   a rivet comprising a rivet head and a rivet leg, the rivet head being implanted in the first workpiece and the rivet leg extending from the rivet head and through the second workpiece, the rivet leg flaring outwardly and upwardly to form a hook portion of the rivet leg that captures and at least partially surrounds material from the second workpiece that is displaced below the back surface of the second workpiece, wherein the rivet leg has a distal tip that penetrates into the back surface of the second workpiece and a space is formed between the back surface of the second workpiece and the hook portion of the rivet leg.

13. The rivet-formed joint of claim 12, wherein the distal tip of the rivet leg curls inwardly back towards the rivet.

14. The rivet-formed joint of claim 12, wherein the hook portion fully surrounds the material from the second workpiece that is displaced below the back surface of the second workpiece.

* * * * *